United States Patent [19]

Volkman

[11] 4,165,352

[45] Aug. 21, 1979

[54] METHOD OF PRODUCING SELF-BONDED, MELT-BLOWN BATTERY SEPARATORS, AND RESULTING PRODUCT

[75] Inventor: Roy G. Volkman, Rariton Township, Hunterdon County, N.J.

[73] Assignee: James River Corp., Richmond, Va.

[21] Appl. No.: 862,843

[22] Filed: Dec. 21, 1977

Related U.S. Application Data

[63] Continuation-in-part of Ser. No. 733,029, Oct. 18, 1976, abandoned, and a continuation-in-part of Ser. No. 267,420, Jun. 29, 1972, abandoned.

[51] Int. Cl.² .............................................. B04H 1/16
[52] U.S. Cl. .................................... 264/113; 264/118; 264/121; 264/128
[58] Field of Search ................. 264/113, 128, 118, 121

[56] References Cited

U.S. PATENT DOCUMENTS

| 3,847,676 | 11/1974 | Palmer et al. | 264/211 |
| 3,849,241 | 11/1974 | Butlin et al. | 264/210 |
| 3,870,567 | 3/1975 | Palmer et al. | 264/211 |

Primary Examiner—Robert F. White
Assistant Examiner—James R. Hall
Attorney, Agent, or Firm—Mandeville and Schweitzer

[57] ABSTRACT

The disclosure relates to the production of multi-ply battery separators utilizing mats of melt-blown, randomly laid, self-bonded thermoplastic resin fibers. The process involves the production of at least three separate plies of self-bonded, melt-blown thermoplastic fibers, which are joined in the absence of separate adhesive materials to form a cohesive, multi-ply material. The multi-ply material comprises an internal structure having fiber size, porosity and other characteristics particularly suitable for use in lead-acid battery separator application. The outer plies are formed to have characteristics more suitable for strength and abrasion resistance. In the process of the invention, the several plies are separately formed by melt-blowing techniques, in themselves known, and the several plies are joined in the presence of heat and/or heat and pressure, forming a multi-ply structure entirely free of external adhesive material. The thus-formed multi-ply web is then impregnated with an appropriate wetting agent in liquid solution. Before use, the web material is dried. Importantly, however, the impregnated web before drying is subjected to substantial heat and localized rolling pressure, not only to mechanically disperse the wetting agent, but simultaneously to flash off most of the solvent or carrier, in advance of the basic drying step. Ideally, the mechanical dispersal and flashing off of the wetting agent is accomplished in conjunction with the formation of ribs under heat and pressure in the thermoplastic mat. After being cut to size, the multi-ply mat is folded about the bottom edge of a battery separator plate and thermally sealed along the side edges, forming a complete envelope.

7 Claims, 2 Drawing Figures

METHOD OF PRODUCING SELF-BONDED, MELT-BLOWN BATTERY SEPARATORS, AND RESULTING PRODUCT

RELATED APPLICATIONS

This application is a continuation-in-part of my co-pending application Ser. No. 733,029, filed Oct. 18, 1976 for "Battery Separators" now abandoned. That application, in turn, was a continuation-in-part of application Ser. No. 267,420, filed June 29, 1972, now abandoned.

BACKGROUND AND SUMMARY OF THE INVENTION

The invention is directed to a method of the production of battery separators, particularly for lead-acid batteries of the type used in automobiles, for example. In batteries of the type referred to, a series of lead plates are disposed in an acid electrolyte, and separators are positioned in the spaces between the lead plates. The technical requirements of the separators are quite severe. Among other things, the separator material must be chemically inert to the plate material, the electrolyte, and the chemicals formed during the cycling of the battery. The separators, in addition, must be able to withstand the environment, both from a chemical standpoint and a physical standpoint. With respect to the latter, the separators, while permitting a free flow of ions in the electrolyte material, must prevent any electrical contact between adjacent plates, which might result in short circuiting.

All of these required functions must be carried out in an environment in which wide temperature variations are encountered, and in which the batteries are subjected to substantial vibration, acceleration and deceleration, and other physical movements encountered in normal vehicle use. Additionally, the separators must be capable of high volume production at low cost, in order to be economically attractive in the primary market, automobile batteries.

Various types of battery separators are known in the prior art, including separators constructed of paper, hard rubber, sintered polyvinylchloride, and the like. All of these various known types of separators have various advantages and disadvantages. Some, for example, while forming highly effective separators, are of such high cost as to be suitable only in special purpose applications. Others, while being of lower cost, are less effective in terms of performance under the exceptionally severe conditions required of an automobile battery.

The present invention deals particularly with a method of making battery separators formed of melt-blown thermoplastic web material. In general, such battery separators have been described in, for example, U.S. Pat. No. 3,881,957. However, notwithstanding the technical information available in the before mentioned patent and other disclosures both preceding and following it, I am not aware of any commercially successful battery separator formed of melt-blown thermoplastic material, other than that produced in accordance with the method of the present invention. In this respect, all of the objectives and all of the requirements of a good battery separator are well known to all concerned. Nevertheless, the manner of achieving the known requirements and at the same time being able to produce separators in high volume at acceptable cost levels remains elusive.

In accordance with the primary objective of the present invention, a novel and improved method is provided for the production of battery separators of melt-blown thermoplastic materials on a basis which is compatible with high volume, low cost requirements of the automotive market, yet which is capable of producing a battery separator of acceptably high quality standards.

In accordance with the process of the invention, a multiple ply web is formed of a plurality of individual webs of melt-blown thermoplastic resin material. In general, these individual webs are formed in accordance with known procedures, such as disclosed in the Buntin U.S. Pat. No. 3,849,241. A thermoplastic material, such as polypropylene, is heated and extruded through a series of extremely fine openings. The emerging fiber-like extrusions are subjected to the action of hot, high velocity air streams discharged from narrow slots immediately adjacent the extrusion die openings. A fibrous mat, of controlled properties, is collected on a moving, foraminous belt or drum. By controlling variables, such as the volume and/or temperature of the air stream, fibrous mats of different physical properties may be produced. In a multiple ply material for battery separator use, a core ply structure is formed of fine fibers, having extremely fine average pore size, while outer plies are formed of somewhat heavier fibers. Either in the original formation or subsequently, the multiple plies are bonded in the absence of any external adhesive material to form the desired composite material.

Pursuant to the invention, the melt-blown fibers of the multiple ply material are rendered wetable by battery electrolyte solution by coating with one or more compatible surfactant solutions or wetting agents a procedure which, in general, is well known. Importantly, after impregnation of the web with the surfactant solution, but before drying of the web, the multiple ply web is subjected to simultaneous heat and localized rolling pressure, in an operation effective to mechanically disperse the surfactant throughout the web and simultaneously to flash off a substantial portion of the surfactant solvent or carrier without, however, melting the thermoplastic material. Thereafter, the small residue of solvent or carrier may be removed from the web by conventional drying techniques, such as by passing hot air through the porous material.

To significant advantage, the operation of applying heat and localized rolling pressure is performed in a manner simultaneously to impart thickness compaction and longitudinal ribbing to the web material, to provide desired strength, rigidity and other characteristics to the web for the intended battery separator application.

The web material formed by the procedures described is converted to battery separators by being slit into appropriate width, cut to length and folded in half about the lower edge of a battery separator plate. The side edges of the folded separator material extend slightly beyond the edges of the plate and are thermoplastically bonded, providing an open top envelope for containment of the battery plate.

In one specifically advantageous modification of the new process, the multi-ply web material is formed in four stages, with the formation of four successive melt-blown webs, advantageously formed one upon the other in sequence. Pursuant to this aspect of the invention, an external web is formed, followed by two webs of core material, followed in turn by a second web of external material. While the end result does not differ significantly in terms of functional properties of the battery separator from a three-ply web, more advantageous utilization may be made of production capacity following the four web procedure.

For a more complete understanding of the above and other features and advantages of the invention, reference should be made to the following detailed description of a preferred embodiment and to the accompanying drawing.

DETAILED DESCRIPTION OF THE INVENTION

A battery separator web according to the invention is produced by preparing and combining a plurality of individual plies, which are combined and bonded thermally, in the absence of adhesives or other externally applied materials. The individual webs may be produced by procedures such as those disclosed in the Buntin U.S. Pat. No. 3,849,241, for example. In the schematic arrangement of FIG. 1, a conveyor 30, which can be a single, continuous conveyor or a succession of individual conveyors running at the same speed, is arranged underneath a plurality of extruder heads 31–34 inclusive, which may be of the general type described in the before mentioned Buntin Pat. No. 3,849,241 and publications referred to therein, and which, per se, does not form a part of the present invention. In the illustrated arrangement, the upstream extruder head 31 deposits on a foraminous belt 35 of the conveyor 30 a first melt-blown web of appropriate thermoplastic material. Polypropylene is a particularly advantageous such material, although polystyrene and perhaps other inert thermoplastic materials may be suitable for the purposes intended.

Pursuant to the invention, the first ply is formed of fibers having an average diameter greater than thirty microns, and advantageously within the range of about thirty to forty microns. This first ply, which forms an outer ply in the finished web material, has a basis weight not less than about twenty-five $g/m^2$, and preferably within the range of about forty to fifty $g/m^2$. Control over the basis weight is effected by appropriately relating the rate of extrusion to the rate of advancement of the foraminous conveyor belt 35.

Figure 1:
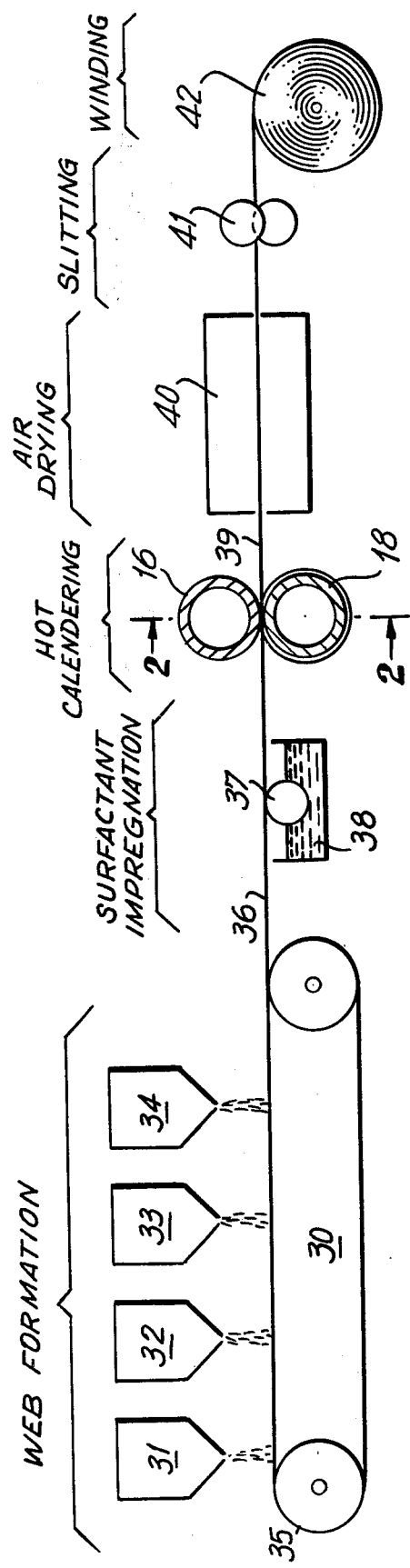
FIG. 1 is a simplified schematic representation of the process according to the invention for the production of multi layer web material for battery separator utilization.

According to the invention, a core ply is formed of the same material as the first ply, and the core ply advantageously is formed directly on the first ply, so that a degree of thermal bonding between the plies occurs as part of the forming process. In the arrangement of FIG. 1, the core ply is formed by two extruders 32, 33, which produce melt-blown, random laid webs with average fiber diameters within the range of about two to ten microns. The basis weight of the core ply, according to the invention, is in the range of eighty to one hundred thirty $g/m^2$ and more preferably in the range of ninety to one hundred ten $g/m^2$. In the particular arrangement in FIG. 1, the core ply actually consists of two self-bonded plies of like composition, constituting the second and third plies in the specific process illustrated.

Immediately following the formation of the core ply, a second outer ply is produced by the extruder 34, which forms a melt-bonded, random laid web directly on and thermally bonded to the preceding webs. The last mentioned ply, which may be considered the fourth ply, is of generally the same construction and basis weight as the first ply, providing substantially a three-ply, symmetrical web material consisting of a core ply of a given basis weight and outer plies of approximately half the basis weight of the core ply.

Although the three-ply type construction just described can be produced in an entirely satisfactory manner using three melt-blowing extruders, significant production economies can be achieved by utilizing four. Using four extruders, arranged as illustrated in FIG. 1, it is possible to use four generally identical extruders, operating each at substantially full capacity, with each extruder laying a generally equivalent weight per unit of time and unit of area. Since the core ply of the multi-ply web has approximately twice the basis weight of the individual outer plies, a production process utilizing three extruders would require either the use of dissimilar extruders for the different plies or operation of the first and last extruder at levels substantially below rated capacity. While such a procedure is considered to be within the broadest concept of the invention, substantial advantages are realizable by the utilization of four extruders of generally like construction, each operated substantially at rated capacity.

Where the several webs are formed one upon the other, there is a degree of self-bonding (both mechanical and, to some degree, thermal) which occurs between the successive plies during formation. This provides for cohesiveness of the multi-ply structure in the complete absence of any external adhesives or other substances that could inhibit the functioning of the battery. Preferentially, therefore, it is desired that several plies be formed successively one upon the other. Nevertheless, it is acceptable to form the plies independently, bring them together in the proper sequence and join them by the application of heat and rolling pressure. Experience indicates that several plies can be joined in this manner with adequate cohesiveness without adversely affecting the functional characteristics of the web material for battery separator utilization.

Wetability (and for some applications re-wetability) is an extremely important property of battery separators. That is, the fibers of the battery separator material must be thoroughly and uniformly wetable with the electrolyte solution. To the extent that there are any localized, unwetable areas, the effectiveness of the battery is proportionately reduced because of the inability of the ions to be transferred where there are voids in the electrolyte. Accordingly, imparting wetability to the web material is an important step in the process of the invention, and the step is carried out in a unique and advantageous manner, to achieve optimum wetability while at the same time relatively simplifying the overall process.

Pursuant to the invention, the combined, multi-ply web 36 is passed in contact with a roller 37 which applies wetting agent from a bath 38. Although the specific manner of initial application of the wetting agent is not critical, one advantageous arrangement is to utilize a gravure-type roller 37 which is partially immersed in a bath 38 of the wetting agent. The gravure roller, rotating in synchronism with the forward movement of the web 36, applies a substantial volume of the wetting agent to the web, which is at least partly dispersed into the web. Typically, the ratio of the wetting agent solution (primarily the solvent or carrier) to the web is about one-to-one by weight. Other techniques of application, such as spraying, dipping, etc. may also be employed with satisfactory results, although roller coating in the manner described enables more facile control over the amounts of wetting agent imparted to the moving web material.

For some applications, treatment with a single surfactant or wetting agent is adequate. However, where re-wetability of the separator web is an important requirement, treatment with a combination of surfactants is advantageous, as for example described in U.S. Pat. No. 3,472,700, to which reference may be had for further detailed information. In general, where combinations of surfactants are utilized, an anionic agent is applied first, followed by a cationic agent. The preferred surfactants or wetting agents which may be used are sodium dialkyl sulfosuccinate, which is commercially available as Nekal WS-25, a product of GAF Corporation, and ethoxylated quatenaly alkyl aryl fatty amine hydrohalide, which is commercially available as Nopco DE-126, a product of Diamond Shamrock Chemical Co.

As an extremely important aspect of the invention, while the multi-ply web material is still wet with the surfactant solution or solutions, the web is controllably compressed between heated rolls having a surface temperature hot enough to flash off the surfactant solvent, typically water or alcohol, but not hot enough to cause melting of the thermoplastic fibers and consequent loss of porosity. Significant to this step, is the application of heat and rolling pressure in a manner such that the solution of wetting agent or agents is first mechanically dispersed throughout the web in a uniform manner by the squeezing action of the rolls. Simultaneously, substantial localized heat is applied to the web (by the heat of the rolls) to effect immediate evaporation or flashing off of the solvent carrier of the surfactant solution.

As reflected in FIG. 1, for example, the impregnated web 39, still fully wet with the just-applied surfactant solution, passes between opposed, hot calendering rolls 16, 18, simultaneously squeezing and heating the web. The rolls 16, 18 desirably are spaced apart with rigid stops, so as to limit the degree of compression of the web. The spacing of the rolls is such that the compressed web still retains at least 40% void volume, and preferably 50-55% void volume. For polypropylene monomers, the surface temperatures of the rolls are maintained within the range of about 115° C. to about 145° C., and preferably in the range of 129-132° C. For different resins, having different melting points, different roll surface temperatures may be required, as will be readily understood, the objective being to compact the web material in thickness, and to flash off most of the solvent carrier for the surfactant solution, while avoiding melting of the fiber structure of the web material.

Rapid evaporation of flashing off of the surfactant solvent or carrier, in conjunction with mechanical dispersal thereof, is a significant aspect of the invention, because conventional drying of the web from a relatively saturated state is accompanied by substantial migration of the surfactant solution and consequent reduction in wetability of the product. By flashing off the solvent carrier, while simultaneously mechanically displacing and dispersing the solution, migration of the surfactant is greatly minimized or avoided. Pursuant to the invention, the application of heat and rolling pressure in the hot calendering rolls 16, 18 is such that the solvent-to-web weight ratio is reduced to about 1-to-10, from about 1-to-1 immediately after the impregnating step at the coating roller 37.

Figure 2:
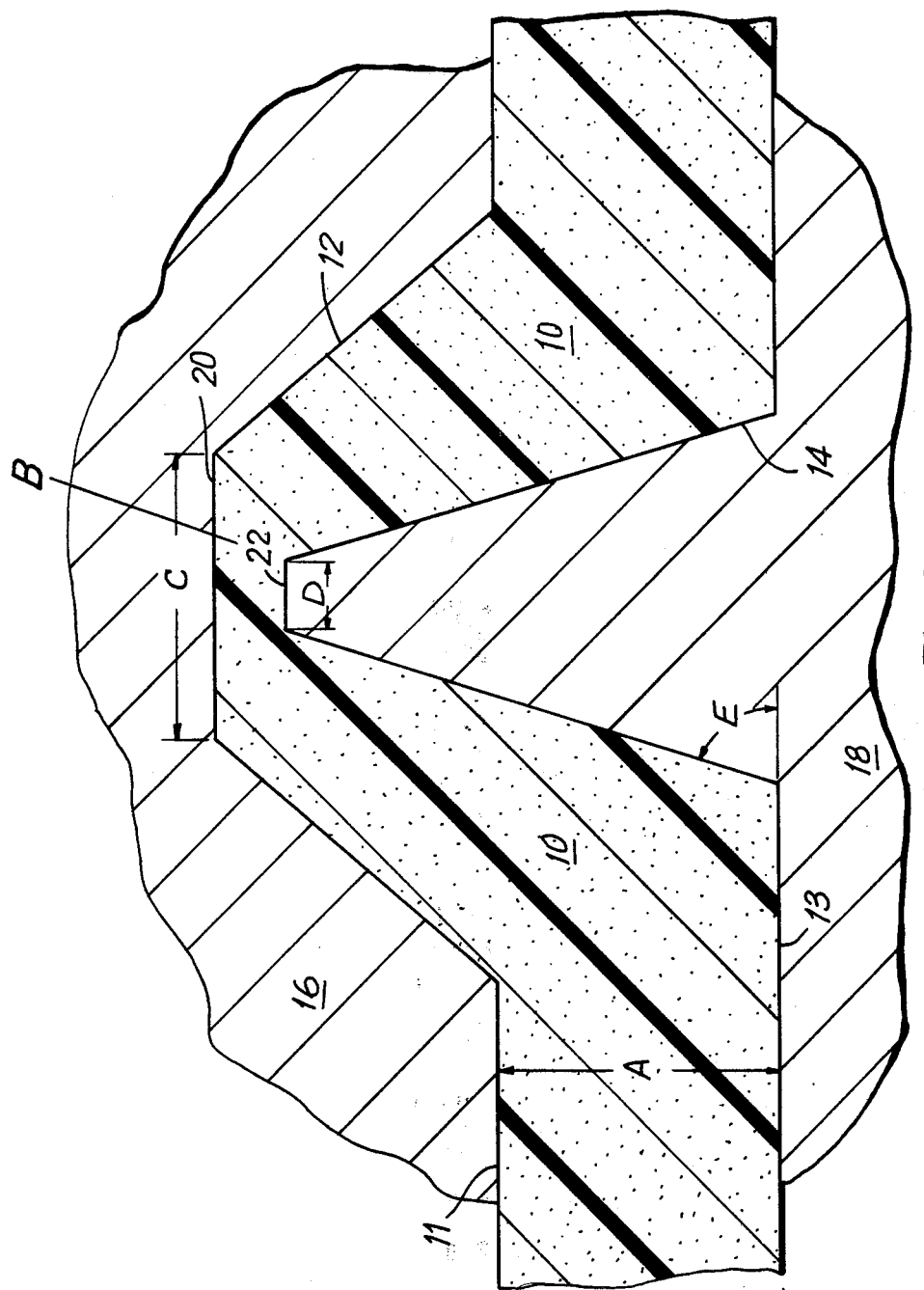
FIG. 2 is an enlarged, cross sectional view, as taken generally on line 2—2 of FIG. 1, illustrating the cross sectional configuration of rib-forming calendering rolls.

To particular advantage, the hot calendering operation, which immediately follows surfactant impregnation, is utilized additionally to shape the web material, to form longitudinal ribs, which are desired for both spacing and rigidity in the web material for battery separator utilization. To this end, the calendering rolls 16, 18 are provided with outer surfaces 11, 13 formed respectively with interfitting annular grooves 12 and ridges 14, as indicated in the enlarged fragmentary section of FIG. 2. The primary surfaces 11, 13 are separated (preferably by positive spacer means, not shown) by a predetermined distance A, which will determine the compacted thickness of the web material in the areas between longitudinal ribs.

The shaping of the grooves and ridges 12, 14 is such as to provide a rib structure in the web material having a relatively heavy root area 10, while being somewhat thinner and more compacted at the crown area B. In the illustrated arrangement, the base 20 of the groove 12 has a rib dimension C which is substantially greater than the dimension D of the crown 22 of the annular ridge 14. The spacing between the surface areas 20, 22 advantageously is in the range of about 12½% to 50% of the spacing A, between the primary roller surfaces 11, 13, and most advantageously is about 25% of that dimension. Desirably, the walls of the ribs taper in thickness from the root area to the crown area, which is achieved by controlling the angularity of the side walls of the respective grooves and ridges 12, 14. In the illustrated arrangement, the side walls of the grooves 12 may be at an angle of about 45° to the roll surface 11, while the side walls of the ridges 14 may be at an angle (E) of about 72° to the roll surface 13. The spacing A is controlled to provide a compressed structure in which the internal or core ply has a porosity greater than 50% and a maximum pore size of less than twenty-five microns. In a typical case, with a multi-ply material of about 200 $g/m^2$ basis weight (50-100-50), this can be accomplished by compressing the web to a thickness (dimension A) on the order of 0.5 mm.

Inasmuch as a significant aspect of the invention involves hot roll calendering of the surfactant-saturated web material after surfactant impregnation, it is particularly suitable to make advantageous use of the hot compressing rolls to simultaneously hot form the longitudinal ribs, instead of doing that as a separate operation.

After hot calendering, the web advantageously is passed through a drying oven 40, in which remaining solvent carrier from the surfactant impregnating step is removed. Because of the highly porous nature of the web material, this can be conveniently done by passing heated air directly through the wet material. Undesirable migration of the surfactant is not a significant problem at this stage of the described process, because of the fact that most of the surfactant carrier has been previously flashed off in the course of the hot calendering operation.

Typically, after drying, the web material is passed through a slitting station 41, which functions to slit the web longitudinally to desired width, after which the individual strips are coiled at a winding station 42.

Eventually, the individual strips are cut to length and utilized as battery separators.

The battery separator material of the present invention is particularly adapted to be folded in the form of an envelope around a battery plate. The described material can easily withstand such folding without breaking or cracking, even where, as is typical, the fold line is at right angles to the direction of the strengthening ribs. Separator material can be made somewhat wider than the width of the battery plates and, after folding, can be sealed along the side edges as by ultrasonic vibration, heat and pressure, or even by adhesive provided it is completely inert to the battery environment. The envelope form of battery separator is used to wrap the cathode plates in maintenance free sealed batteries.

Battery separators made in accordance with the process of the present invention possess superior functional characteristics, yet can be produced on a mass production basis, with good, consistent quality and at a cost which is acceptable to the automotive trade. By producing the web material in a multi-ply construction, which is, however, combined in the complete absence of any external materials, it is possible to achieve a uniquely advantageous combination of properties for the specific end use intended. Thus, the core ply has an extremely fine fiber size and void structure, so as to form an effective mechanical barrier between battery plates, while at the same time accommodating the presence of the electrolyte and the free flow of ions between plates during charging and discharging of the battery. The outer plies, of somewhat larger fiber size, provide the necessary mechanical strength and abrasion resistance for the intended use. In this respect, although multiple-ply battery separator structures have been known heretofore, the structure of the present invention is uniquely effective in the specific environment intended, because of the ability of the several plies to be self-bonded. Heretofore, where multiple ply structures have been utilized, coating materials have been utilized, which not only add significantly to production costs, but perhaps more importantly inhibit the free flow of electrolyte and ions which is important to battery operation.

An especially significant aspect of the present invention involves the manner of applying the fixing surfactant materials on the web material, in order to provide desired levels of wetability of the fiber separator material. Pursuant to the process of the invention, the multi-ply web material is saturated with surfactants solution, and is then subjected simultaneously to substantial heat and rolling pressure in a hot roll calendering pass. In passing through the hot roll calender, the surfactant solution is simultaneously mechanically dispersed throughout the web while the solvent carrier is flash evaporated therefrom. The web emerging on the exit side of the hot roll calendering stage is substantially reduced in its content of surfactant solvent (as much as 90% having been flashed off in passing through the hot roll calendar). Thereafter, the balance of the surfactant solvent can be effectively air dried without detrimentally affecting the wetability of the web material through surfactant migration. Hot roll calendering of the surfactant-saturated web is considered an essential feature of the new process since, otherwise, costly and difficult procedures must be followed in order to achieve adequate levels of wetability. In some prior processes, for example, it has been proposed to apply surfactant solution to the web, followed by calendering with cold rolls for mechanical dispersion of the surfactant, followed by air drying. Hot calendering, for compressing the web and/or forming of ribs is carried out subsequent to air drying. However, such a procedure results in considerable migration of the surfactant during the air drying stage, such that wetability of the web material is significantly reduced. Mechanical dispersion of the surfactant by unheated rollers does not prevent the subsequent migration of the surfactant during the air drying process.

Pursuant to the present invention, however, the surfactant solvent is largely evaporated simultaneously with the mechanical dispersion of the solution and the web passes through the hot roll calender rolls. Because of the substantially reduced solvent present in the calendered web, any subsequent migration during the final air drying stage is at a tolerable level.

One of the more specific advantageous features of the new product resides in the formation of what is essentially a three-ply web utilizing a series of four extruders of like production capacity. The multi-ply web material of the invention has a core ply basis weight which is approximately double the basis weight of the individual outer plies. By forming the core ply in two layers, either one upon the other or separately and then later joined, it is possible to run a production line with four basically similar extrusion presses, each running at full capacity. Significant practical advantages result from utilizing a series of similar extrusion presses, in terms of interchangeability of parts, simplification of production maintenance, inherent flexibility of the operation in the case of breakdowns, etc.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A method of producing battery separator web stock for cutting into battery separators having a wetability property, comprising
   (a) forming a continuous, moving multi-ply web of at least three plies of melt-blown, randomly laid thermoplastic resin fibers, wherein said plies are each separately formed one upon the other as outer plies and a central ply, each ply during formation thereof being bonded to an adjacent ply to a degree by mechanical and thermal self-bonding, said central ply fibers having an average diameter of 2-10 microns, said outer ply fibers having an average diameter of 30-40 microns,
   (b) saturating said moving web with a solution of a surfactant dissolved in a volatile solvent,
   (c) passing said saturated web between rotating opposed heated calendering rolls to reshape said web, to mechanically disperse said solution throughout said web and to heat and rapidly evaporate said solvent,
   (d) passing said web through a drying means to remove any remaining solvent, and
   (e) slitting said web to a size suitable for cutting into battery separators having a wetability property.

2. In the method of claim 1,
   (a) said outer plies each being formed to have a basis weight of about 40-50 g/m$^2$, (b) the core plies, comprising all of the plies between said outer plies, being formed to have a combined basis weight of about 80–130 g/m$^2$, and (c) said core plies being comprised of two plies, each being formed to have a basis weight of about 40–65 g/m$^2$.

3. In the method of claim 2, (a) said core plies being so formed and said heat rolling pressure being so applied that said core plies have a porosity greater than 50% with a maximum pore size of less than twenty-five microns.

4. In the method of claim 3, (a) said plies being formed of a material selected from the group consisting of polypropylene and polystyrene.

5. In the method of claim 4, (a) said material being polypropylene, (b) said rolling pressure being applied in the presence of heat in the temperature range of about 115° C. to 145° C.

6. In the method of claim 1, (a) approximately 90% of the solvent is evaporated during step (c).

7. In the method of claim 1, (a) cutting the slit web material into sections of a size suitable for battery separators.

* * * * *